US012762203B2

(12) United States Patent
Khan et al.

(10) Patent No.: US 12,762,203 B2
(45) Date of Patent: Oct. 13, 2026

(54) SYSTEM AND METHOD FOR IMPLEMENTING VARIABLE-PRECISION MATRIX MULTIPLICATION USING LOW-PRECISION DIGIT MATRIX MULTIPLIER

(71) Applicant: Xcelerium Inc, Orange, CA (US)

(72) Inventors: Hamza Khan, Tustin, CA (US); Asma Khan, Tustin, CA (US); Raheel Khan, Tustin, CA (US)

(73) Assignee: Xcelerium Inc

( * ) Notice: Subject to any disclaimer, the term of this patent is extended or adjusted under 35 U.S.C. 154(b) by 1197 days.

(21) Appl. No.: 17/737,073

(22) Filed: May 5, 2022

(65) Prior Publication Data

US 2023/0359694 A1 Nov. 9, 2023

(51) Int. Cl.
*G06F 17/16* (2006.01)
*G06F 7/523* (2006.01)

(52) U.S. Cl.
CPC .............. *G06F 17/16* (2013.01); *G06F 7/523* (2013.01)

(58) Field of Classification Search
CPC ....................................................... G06F 17/16
See application file for complete search history.

(56) References Cited

U.S. PATENT DOCUMENTS 6,518,970 B1 * 2/2003 Glen ...................... H04N 9/641 348/E5.009
9,910,827 B2 3/2018 Muralimanohar et al.
9,912,349 B1 * 3/2018 Ouyang .................. G06F 17/16
10,599,398 B2 3/2020 Olsen
10,740,693 B2 8/2020 Lazovich et al.
(Continued)

FOREIGN PATENT DOCUMENTS

EP 3686734 A1 7/2020

OTHER PUBLICATIONS

N. M. Stojanovic et al., "Matrix-vector Multiplication on a Fixed Size Unidirectional Systolic Array," 2007 8th International Conference on Telecommunications in Modern Satellite, Cable and Broadcasting Services, Nis, 2007, pp. 457-460, doi: 10.1109/TELSKS.2007.4376040. (Year: 2007).*
(Continued)

*Primary Examiner* — James Trujillo
*Assistant Examiner* — Markus Anthony Villanueva
(74) *Attorney, Agent, or Firm* — Jason C. Cameron

(57) ABSTRACT

A system and method for implementing variable-precision matrix multiplications using a low-precision digit matrix multiplier is disclosed. The system enables multiplication of matrices of different dimensions by splitting the large matrix into fixed-size matrix blocks. These block matrices are further decomposed into fixed-precision digit submatrices that are then individually multiplied, scaled, and accumulated to allow for variable-precision matrix multiplication. The system uses a systolic array of block matrix multipliers, which are each an array of dot product units, to efficiently implement larger matrix multiplications without substantially increasing either latency or wiring congestion. The system further uses only unsigned digit matrix multipliers but accounts for signed matrix multiplication by using row and column sums of the input matrices to adjust for the signed to unsigned conversion.

8 Claims, 13 Drawing Sheets

(56) References Cited

U.S. PATENT DOCUMENTS

| | | | | |
|---|---|---|---|---|
| 2005/0125635 | A1* | 6/2005 | Symes | G06F 9/3013 712/E9.034 |
| 2012/0030541 | A1* | 2/2012 | Okamura | H03M 13/6527 714/E11.032 |
| 2019/0213234 | A1 | 7/2019 | Bayat et al. | |
| 2019/0294413 | A1* | 9/2019 | Vantrease | G06F 17/15 |
| 2019/0310854 | A1* | 10/2019 | Bainville | G06F 9/3836 |
| 2019/0339942 | A1* | 11/2019 | Olsen | G06N 3/063 |
| 2020/0150923 | A1* | 5/2020 | Muralimanohar | G06F 7/5443 |
| 2020/0272795 | A1* | 8/2020 | Kenney | G06J 1/005 |
| 2022/0156343 | A1* | 5/2022 | Maiyuran | G06F 7/5443 |
| 2023/0103312 | A1* | 4/2023 | Liu | G06F 9/5027 708/520 |
| 2023/0273972 | A1* | 8/2023 | Mehendale | G06N 3/063 |

OTHER PUBLICATIONS

Patterson, David A., and John L. Hennessy. Computer Organization and Design: The Hardware/Software Interface (5th Edition). Morgan Kaufmann, 2013. (Year: 2013).*

* cited by examiner

900

SYSTEM AND METHOD FOR IMPLEMENTING VARIABLE-PRECISION MATRIX MULTIPLICATION USING LOW-PRECISION DIGIT MATRIX MULTIPLIER

FIELD OF INVENTION

Embodiments of the present disclosure relate to the field of processing systems and more particularly to a system and method for implementing variable-precision matrix multiplication using a low-precision digit matrix multiplier.

BACKGROUND

A Central Processing Unit generally performs different computing tasks such as running application software, operating systems, graphics processing, image processing, and digital signal processing, some of which can be off-loaded to specialized accelerators (e.g., graphics and image processing on a Graphics Processing Unit). Each described processor is programmed in a different manner. Era of big data processing demands higher performance at lower energy as compared with today's general-purpose processors.

Most conventional scalar and data-parallel processors operate on a small subset of data types, often limited to only 8, 16, 32, or 64-bit data. However, in fields like signal processing and machine learning, lower and more varied precisions are becoming increasingly prevalent, such as 2-bit, 4-bit, or 12-bit data. For instance, machine learning problems may require different precisions and matrix sizes in different neural network layers, as well as separate precisions for each operand (such as weights and inputs). As such, the ability to operate on minimum-precision operands while maintaining desired accuracy can in some cases give an order of magnitude or more savings of power and latency.

One of the most common computation kernels in machine learning is matrix-matrix multiplication, which takes two input matrices and returns a matrix result where each output element is the inner product of a row of the first matrix and a column of the second. A larger matrix problem can be decomposed into several smaller matrix multiplications of a fixed "block size" and then combined. The multiplication of two matrices A and B is essentially a series of dot products of the rows of A with the columns of B. Equation (1) below depicts an example of the two input matrices A and B being broken into 9 blocks each (3 rows by 3 columns), where each output block of the matrix multiply is the inner product of a row of A and a column of B (e.g.: $C_0=A_0*B_0+A_1*B_3+A_2*B_6$): A matrix multiplier is made up of many dot product units, each of which computes the dot product of a row of A with a column of B. Note that the full-precision output of a dot product unit contains more bits than any 'individual element of A or B due to the bit growth after each multiplication and addition.

$$\overbrace{\begin{pmatrix} A_0 & A_1 & A_2 \\ A_3 & A_4 & A_5 \\ A_6 & A_7 & A_8 \end{pmatrix}}^{k1\times k2}\overbrace{\begin{pmatrix} B_0 & B_1 & B_2 \\ B_3 & B_4 & B_5 \\ B_6 & B_7 & B_8 \end{pmatrix}}^{k2\times k3}=\overbrace{\begin{pmatrix} C_0 & C_1 & C_2 \\ C_3 & C_4 & C_5 \\ C_6 & C_7 & C_8 \end{pmatrix}}^{k1\times k3} \quad \text{equation (1)}$$

One conventional approach, such as Bit-serial Matrix Multiply (BISMO), which is a vectorized bit-serial matrix multiplication overlay, contains a fully parallel Dot Product Unit (DPU) array. Unlike element-level multi-precision approaches, BISMO uses a matrix level multi-precision approach. However, the BISMO approach relies on bit-level decomposition, which limits the throughput that can be achieved, and broadcasting of information within the entire matrix array, which leads to wiring congestion and makes it difficult to scale for larger matrix sizes. As a result, BISMO is not suitable for high-performance matrix multiplication.

Yet another approach is a systolic array of multipliers. Specifically, Tensor Processing Unit (TPU) uses fixed 8-bit multipliers and is designed for 256×256 matrices. TPU is unable to efficiently handle lower precisions such as 2-bit or 4-bit and smaller matrix dimensions such as 8×8 or 32×32. Additionally, due to the high latency of systolic arrays, the TPU is not suitable for embedded applications.

In another approach, the Intel Xeon processor uses vector instructions to compute bit-level dot-products by ANDing two vectors and counting the number of ones remaining. Throughput is limited because computation is not matrix level and there is not enough recirculation of data. Furthermore, there is a lot of overhead of converting from natural order in-memory representation to bit-serial representation. As a result, the Intel Xeon is also not suitable for high-performance low-precision matrix multiplication.

Moreover, existing matrix multiply systems use one of many schemes such as dot product arrays and systolic arrays. However, these operate on a fixed data type, such as an 8-bit systolic array. Sometimes, these matrix multipliers can be used to also work on a limited subset of hard-coded larger precision data types like 16, 32, or 64 bits. These systems do not allow for low-precision operations (those below 8 bits), such as 2- or 4-bit data types. They also do not give flexibility for any multiples of the matrix multiplier data size, such as allowing for 24-bit data with an 8-bit matrix multiplier.

Hence, there is a need for an improved system and method for implementing variable-precision matrix multiplications using a low-precision digit matrix multiplier.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a system and method for implementing variable-precision matrix multiplications using a low-precision digit matrix multiplier is disclosed. The system comprises a load store unit configured to load and store matrix data between a register file and either on-chip or off-chip system memory. The system further comprises the register file configured to provide data in natural order to a permute unit. The system further comprises the permute unit, configured to deinterleave the data, i.e., to convert the data into fixed dimension and fixed precision sub-matrices. The deinterleaved data is stored back into the register file. The system further comprises a digit matrix multiplier unit configured to receive digit matrices in deinterleaved form from the register file. The digit matrix multiplier unit is composed of multiple subsystems to perform various operations. The subsystems include an input unit, a compute unit, a combination unit, and an output unit. The input unit is configured to decode instructions and generate control signals. Concurrently, in the input unit, the digit matrices are buffered, and a portion of the digit matrices are transmitted to the compute unit to be multiplied. The compute unit is configured to compute the product of two digit matrices and transmit the product to a matrix combination unit to be accumulated. The product of the digit matrices is computed using an array of dot product units (DPUs). Each DPU computes a dot product of one row of one digit matrix and one column of the other digit matrix. The matrix combination unit accumulates the results of the current digit matrix multiplication with the results of previous multiplications and applies offsets as needed to account for the multi-precision aspect and unsigned product to signed product conversion. Accumulation results are stored locally inside the matrix combination unit, and portions of the results are transmitted to an output unit. The output unit converts full-precision elements of the matrix product to a reduced precision by performing scaling, rounding and saturation operations.

The present disclosure also includes a method for implementing variable-precision matrix multiplications using a low-precision digit matrix multiplier. The method comprises decomposing a first matrix A into a set $\{A_{ir}\}$ of n×n sub-matrices of M-bit digits and decomposing a second matrix B into a set $\{B_{rj}\}$ of n×n sub-matrices of M-bit digits. Here, matrix A is an N1×N matrix and matrix B is an N×N2 matrix, and $$i = \left\{0, \ldots, \frac{N1}{n} - 1\right\}, r = \left\{0, \ldots, \frac{N}{n} - 1\right\}, \text{ and}$$
$$j = \left\{0, \ldots, \frac{N2}{n} - 1\right\}.$$

The product of A and B is an N1×N2 matrix C.

The matrices A and B and their corresponding sets $\{A_{ir}\}$ and $\{B_{rj}\}$ are stored in the system memory. The method further comprises initializing i and j to 0. The method further comprises computing product sub-matrix $C_{ij}$. The computation of the product sub-matrix $C_{ij}$ comprises of an outer and inner loop.

The outer loop computation is initialized by setting r to 0 and initializing an n×n bank of accumulators, ACC, to 0 and repeating an outer loop iteration step, followed by incrementing r provided that r is less than N/n. The outer loop iteration step comprises retrieving the sub matrix $A_{ir}$ and the submatrix $B_{rj}$ from the system memory and placing them in intermediate storage. The outer loop iteration step further comprises computing product $A_{ir}$×$B_{rj}$, the computation of which includes accumulating into ACC. Once all the outer loop iteration steps have completed, the method further comprises post-processing of each accumulator element by multiplying it with a defined scale factor and performing rounding and saturating to produce an element of $C_{ij}$, and storing it in the system memory.

The computation of the product $A_{ir}$×$B_{rj}$ comprises decomposing $A_{ir}$ into a set of K m-bit digit matrices $$\{A_{ir}^{k0}\}$$

by deinterleaving each digit position for each element of $A_{ir}$. In this case, digit position k0 ranges from {0, . . . , K−1}. In this case, each $$A_{ir}^{k0}$$

has a corresponding scale factor $2^{m*k0}$. The computation of product $A_{ir}$×$B_{rj}$ further comprises decomposing $B_{rj}$ into a set of K m-bit digit matrices $$\{B_{rj}^{k1}\}$$

by deinterleaving each digit position for each element of $B_{ir}$. The digit position k1={0, . . . , K−1}. In this case, each $$B_{rj}^{k1}$$

has a corresponding scare factor $2^{m*k1}$. The digit matrices $$A_{ir}^{k0} \text{ and } B_{rj}^{k1}$$

are placed in the intermediate storage. The computation of product $A_{ir}$×$B_{rj}$ further comprises initializing k0 and k1 to 0, setting the scale factor, S, to 1, and performing the inner loop computation.

The inner loop computation comprises of several iteration steps. One inner loop iteration step is performed by retrieving $$A_{ir}^{k0} \text{ and } B_{rj}^{k1}$$

from intermediate storage, followed by computing an intermediate matrix T (an n×n digit matrix) by multiplying using $$A_{ir}^{k0} \text{ and } B_{rj}^{k1}$$

using a digit matrix multiplier functional unit, followed by multiplying T by the scale factor S and adding the resulting product to the accumulator ACC (i.e. ACC=ACC+T*S). The inner loop computation further comprises incrementing k1 and setting the scale factor S equal to $2^{m*(k0+k1)}$ and repeating the inner loop iteration step defined above provided that k1 is less than K. When k1 is equal to K, k1 is set to 0, k0 is incremented, scale factor S is set to $2^{m*(k0+k1)}$ and the inner loop iteration step is repeated provided that k0 is less than K.

Once all the outer loop and inner loop computation has concluded and the result $C_{ij}$ has been placed in system memory, the method further comprises incrementing i and repeating the outer loop and inner loop computations provided that i is less than N1/n. When i reaches N1/n, the method further comprises setting i to 0 and incrementing j and repeating the outer loop and inner loop computations provided that j is less than N2/n. Once all the iterations of i and j have been completed, the result matrix C will be in system memory.

To further clarify the advantages and features of the present disclosure, a more particular description of the disclosure will follow by reference to specific embodiments thereof, which are illustrated in the appended figures. Note that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
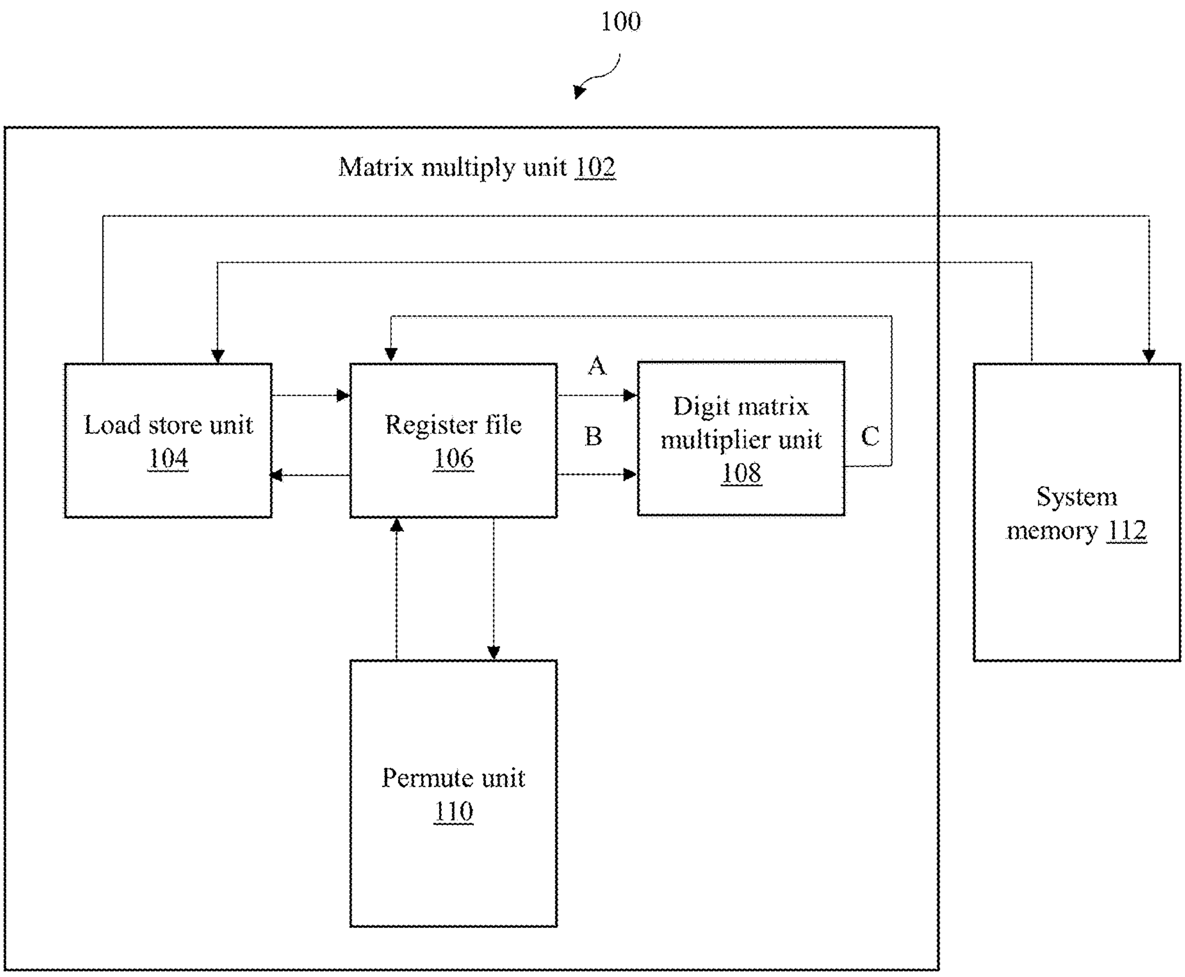
FIG. 1 is a block diagram illustrating a multi-precision matrix multiply unit, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module may comprise dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIGS. 1 through 11, where similar reference characters denote corresponding features consistently throughout the figures, there are shown preferred embodiments and these embodiments are described in the context of the following exemplary system and/or method.

The present disclosure provides a solution for the matrix multiplication problem as several dot product computations. The solution is applied to block matrix multiplication. A large matrix is decomposed into blocks of smaller matrices, and each block is treated like a single piece of data, as shown in table.1. A single block matrix multiply would be computed as follows: $C_0=A_0*B_0+A_1*B_3+A_2*B_6$. Note that each block $A_0 \ldots A_8$ has dimensions $k_{b1}\times k_{b2}$ and each block $B_0 \ldots B_8$ has dimensions $k_{b2}\times k_{b3}$. Hence, each resulting block $C_0 \ldots C_8$ has dimensions $k_{b1}\times k_{b3}$. The present disclosure uses this concept of block decomposition to compute large matrix multiplications.

$$\overbrace{\begin{pmatrix} A_0 & A_1 & A_2 \\ A_3 & A_4 & A_5 \\ A_6 & A_7 & A_8 \end{pmatrix}}^{k1\times k2}\overbrace{\begin{pmatrix} B_0 & B_1 & B_2 \\ B_3 & B_4 & B_5 \\ B_6 & B_7 & B_8 \end{pmatrix}}^{k2\times k3}=\overbrace{\begin{pmatrix} C_0 & C_1 & C_2 \\ C_3 & C_4 & C_5 \\ C_6 & C_7 & C_8 \end{pmatrix}}^{k1\times k3}$$

Table. 1

The higher-precision matrices are decomposed into lower-precision matrices through deinterleaving. The matrices are originally stored in natural order, each element in a row being stored contiguously. Through the deinterleaving process, data is converted so that each element in a row of a digit matrix is stored contiguously; data is then processed by the matrix multiplier in this deinterleaved form.

FIG. 1 is a block diagram illustrating a multi-precision matrix multiply unit 100, in accordance with an embodiment of the present disclosure. The system 100 comprises a load store unit 104 configured to load and store data between a register file 106 and a system memory 112. The system memory 112 may either be external or on-chip. The system 100 further comprises a register file 106 configured to provide data in natural order to a permute unit 110. The system 100 further comprises a permute unit 110 configured to deinterleave the data, convert the data into fixed dimension and fixed precision sub-matrices. The deinterleaved data is stored back into the register file 106. The process of deinterleaving is carried out as follows. Each digit matrix is initially stored in memory, such as system memory 112, in row-major format in natural order. This means elements in a row are stored contiguously and digits in an element are stored contiguously. The purpose of deinterleaving is to convert a matrix of multi-digit elements into multiple matrices with single-digit elements of the same weight stored contiguously. This is needed because the digit matrix multiplier can only process data formatted as single-digit elements. Table. 2 shows a matrix row with 4 elements, each of which is made up of 4 digits. The elements are broken apart into digits then repacked so that digits of the same weight are stored next to each other. Table. 3 shows the result of this deinterleaving. The process of deinterleaving is performed block by block.

matrix multiplier unit 108 further comprises a plurality of subsystems to perform various operations. The plurality of subsystems comprises an input unit 202 configured to decode instructions and generate control signals. Concurrently, in the input unit 202, the digit matrices are buffered for transfer to a compute unit 204 to be multiplied over time. The plurality of subsystems further comprises the compute unit 204 configured to compute the product of two digit matrices and transfer the product to a matrix combination unit to be accumulated. The product of digit matrices is computed using a systolic array of processing elements (PE's), where each PE comprises an array of dot product units (DPU's). The hierarchical distribution of digit matrix computations between DPU arrays within the PE and systolic arrays of PE's allows for large digit matrix sizes within the digit matrix multiplier while reducing overall latency. Each DPU computes the unsigned dot product of one row of one digit matrix and one column of the other digit matrix. To adjust for the product of signed matrices, the row sums of one matrix and the column sums of the other matrix are computed in the compute unit 204. The plurality of subsystems further comprises a matrix combination unit 206 configured to accumulate results of current digit matrix multiplications with the results of previous multiplications and to apply scale factors as necessary to account for the multiprecision computations and to adjust for offsets using row sums and column sums as necessary to account for signed matrix products. Partial accumulation results are stored locally inside the matrix combination unit 206 and, once all accumulations are completed, the accumulation results are transferred to an output unit 208. The plurality of subsystems further comprises the output unit 208 configured to convert full-precision elements of the matrix product to a reduced precision by performing scaling, rounding and saturation operations.

TABLE 2

| | | | | | | | | | | | | | | | |
|---|---|---|---|---|---|---|---|---|---|---|---|---|---|---|---|
| $A3_3$ | $A3_2$ | $A3_1$ | $A3_0$ | $A2_3$ | $A2_2$ | $A2_1$ | $A2_0$ | $A1_3$ | $A1_2$ | $A1_1$ | $Al_0$ | $A0_3$ | $A0_2$ | $A0_1$ | $A0_0$ |
| $A7_3$ | $A7_2$ | $A7_1$ | $A7_0$ | $A6_3$ | $A6_2$ | $A6_1$ | $A6_0$ | $A5_3$ | $A5_2$ | $A5_1$ | $A5_0$ | $A4_3$ | $A4_2$ | $A4_1$ | $A4_0$ |
| $A11_3$ | $A11_2$ | $A11_1$ | $A11_0$ | $A10_3$ | $A10_2$ | $A10_1$ | $A10_0$ | $A9_3$ | $A9_2$ | $A9_1$ | $A9_0$ | $A8_3$ | $A8_2$ | $A8_1$ | $A8_0$ |
| $A15_3$ | $A15_2$ | $A15_1$ | $A15_0$ | $A14_3$ | $A14_2$ | $A14_1$ | $A14_0$ | $A13_3$ | $A13_2$ | $A13_1$ | $A13_0$ | $A12_3$ | $A12_2$ | $A12_1$ | $A12_0$ |

TABLE 3

| | | | | | | | | | | | | | | | |
|---|---|---|---|---|---|---|---|---|---|---|---|---|---|---|---|
| $A15_0$ | $A14_0$ | $A13_0$ | $A12_0$ | $A11_0$ | $A10_0$ | $A9_0$ | $A8_0$ | $A7_0$ | $A6_0$ | $A5_0$ | $A4_0$ | $A3_0$ | $A2_0$ | $A1_0$ | $A0_0$ |
| $A15_1$ | $A14_1$ | $A13_1$ | $A12_1$ | $A11_1$ | $A10_1$ | $A9_1$ | $A8_1$ | $A7_1$ | $A6_1$ | $A5_1$ | $A4_1$ | $A3_1$ | $A2_1$ | $A1_1$ | $A0_1$ |
| $A15_2$ | $A14_2$ | $A13_2$ | $A12_2$ | $A11_2$ | $A10_2$ | $A9_2$ | $A8_2$ | $A7_3$ | $A6_2$ | $A5_2$ | $A4_2$ | $A3_2$ | $A2_2$ | $A1_2$ | $A0_2$ |
| $A15_3$ | $A14_3$ | $A13_3$ | $A12_3$ | $A11_3$ | $A10_3$ | $A9_3$ | $A8_3$ | $A7_3$ | $A6_3$ | $A5_3$ | $A4_3$ | $A3_3$ | $A2_3$ | $A1_3$ | $A0_3$ |

The system 100 further comprises a matrix multiply unit 102 that uses an unsigned digit matrix multiplier unit 108, which includes a systolic array of processing elements (PE's). Each PE computes a digit matrix multiply of a submatrix of smaller dimensions using an array of low-precision integer dot product units (DPU's). The low-precision integer may be 1-, 2- or 4-bit digits.

The unsigned digit matrix multiplier unit 108 calculates the product of two signed matrices and adjusts for the sign correction using the sum of all elements within each row of one matrix and the sum of all elements within each column of the other matrix. The row sums and the column sums are calculated online using dedicated hardware blocks.

Figure 2:
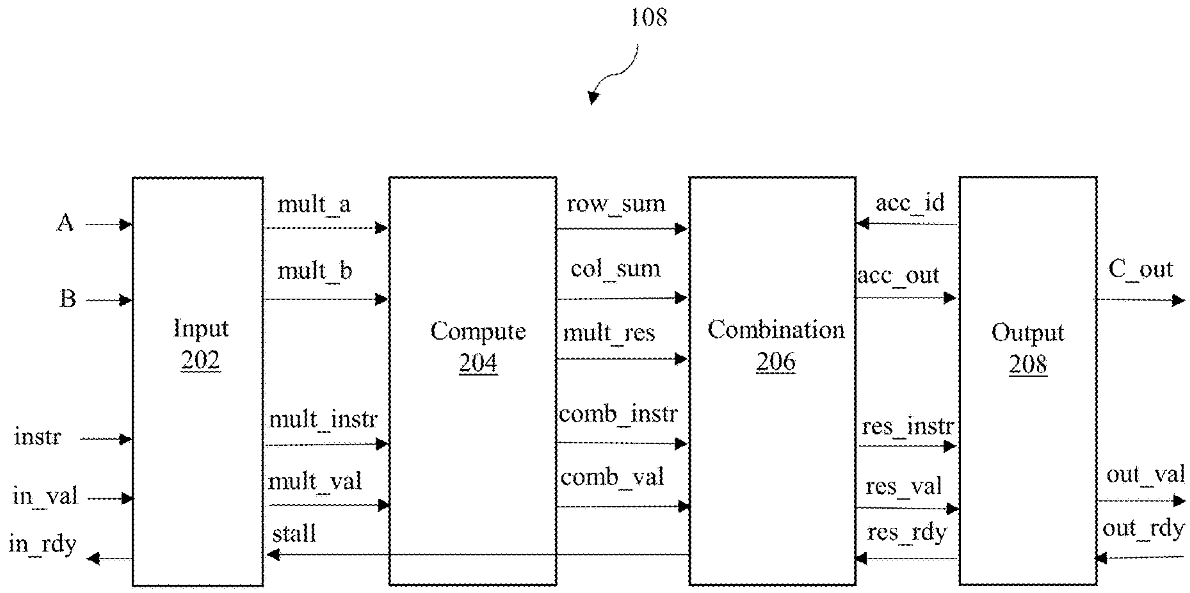
FIG. 2 is a block diagram, illustrating an internal organization of a multi-precision matrix multiply unit, in accordance with an embodiment of the present disclosure.
Figure 3:
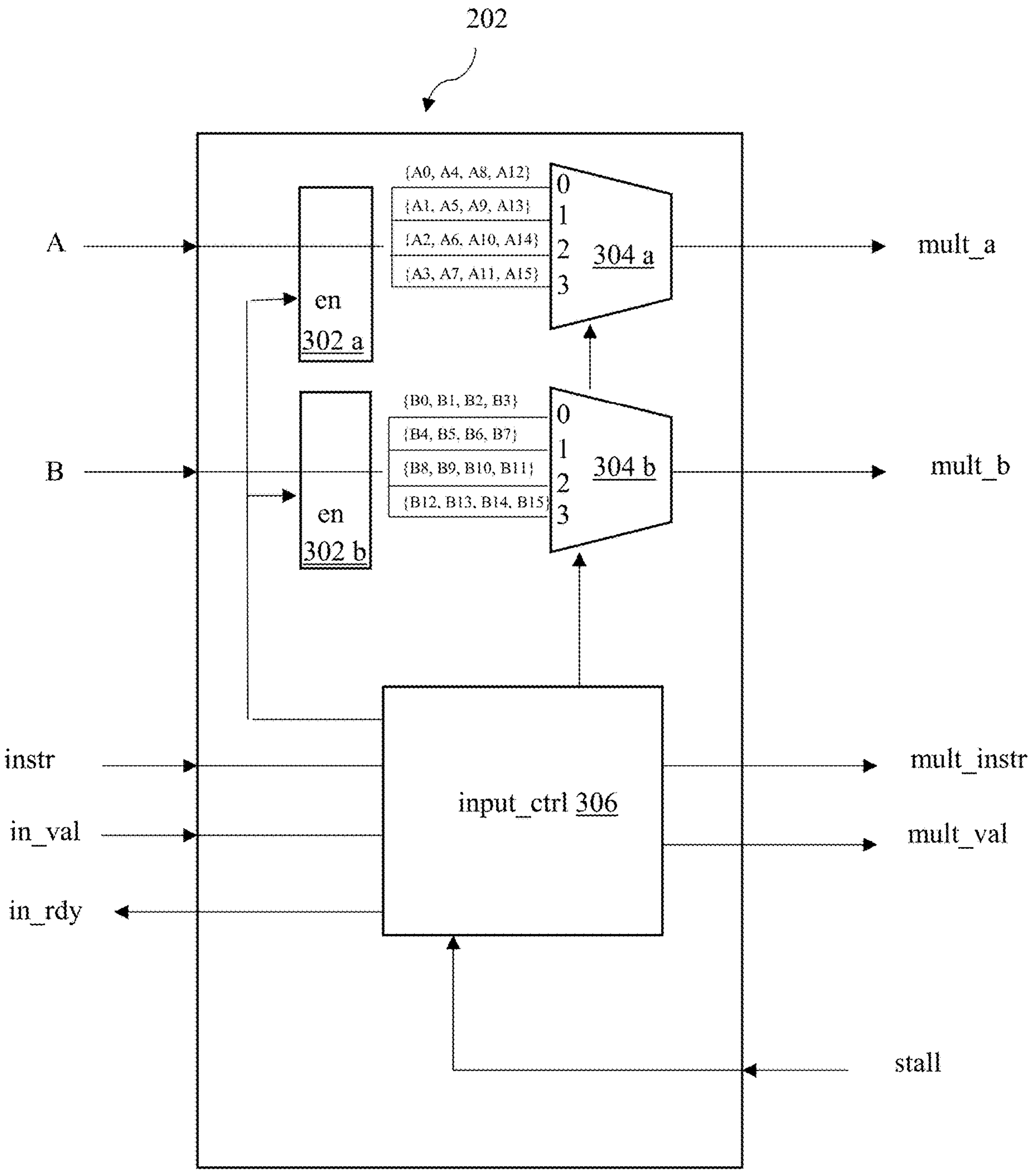
FIG. 3 is a block diagram illustrating an exemplary input unit, in accordance with an embodiment of the present disclosure.

FIG. 2 is a block diagram illustrating an internal organization of the digit matrix multiply unit 108, in accordance with an embodiment of the present disclosure. The digit FIG. 3 is a block diagram illustrating an exemplary input unit 202, in accordance with an embodiment of the present disclosure. The input unit comprises buffers 302*a* and 302*b* for storing the input digit matrices of fixed dimension and fixed digit size, and an input controller 306. The buffered digit matrices are subsequently transferred to the compute unit 204 via transfer components 304*a* and 304*b* over multiple cycles while the input matrices for the next operation are collected in the input unit. In an exemplary embodiment, the input unit may buffer two 32×32 matrices A and B of 2-bit elements while an additional two matrices are being transferred to the compute unit. A and B are each reorganized into 16 sets of 8×8 sub-matrices {A0, . . . , A15} and {B0, . . . , B15}. A subset of four sub-matrices of A and four sub-matrices of B are transferred to the compute unit in each clock cycle.

Figure 4:
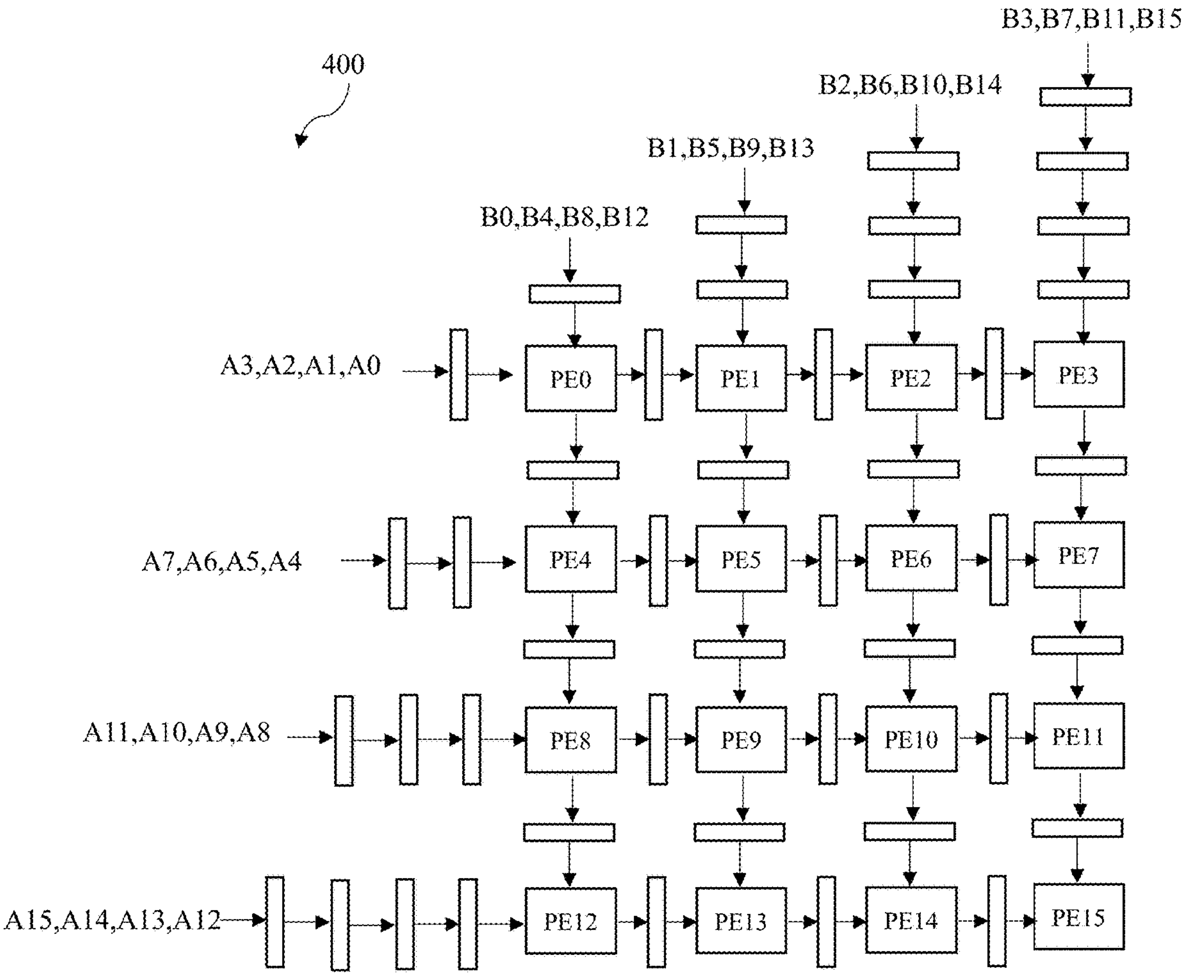
FIG. 4 is a block diagram illustrating an exemplary dataflow for sending blocks of A and B into a systolic array of block matrix multipliers, in accordance with an embodiment of the present disclosure.

FIG. 4 illustrates an exemplary input data flow 400 of digit matrices A and B within the systolic array of PE's that comprises the compute unit 204. The illustration shows how data is shared within the systolic array for efficiency. Sub-matrices of A are shared by PE's in the same row. Sub-matrices of B are shared by the PE's in the same column. At every clock cycle, the sub-matrix of A at the input of each PE is passed to the right. At every clock cycle, the sub-matrix of B at the input of each PE is passed down to the row below.

Figure 5:
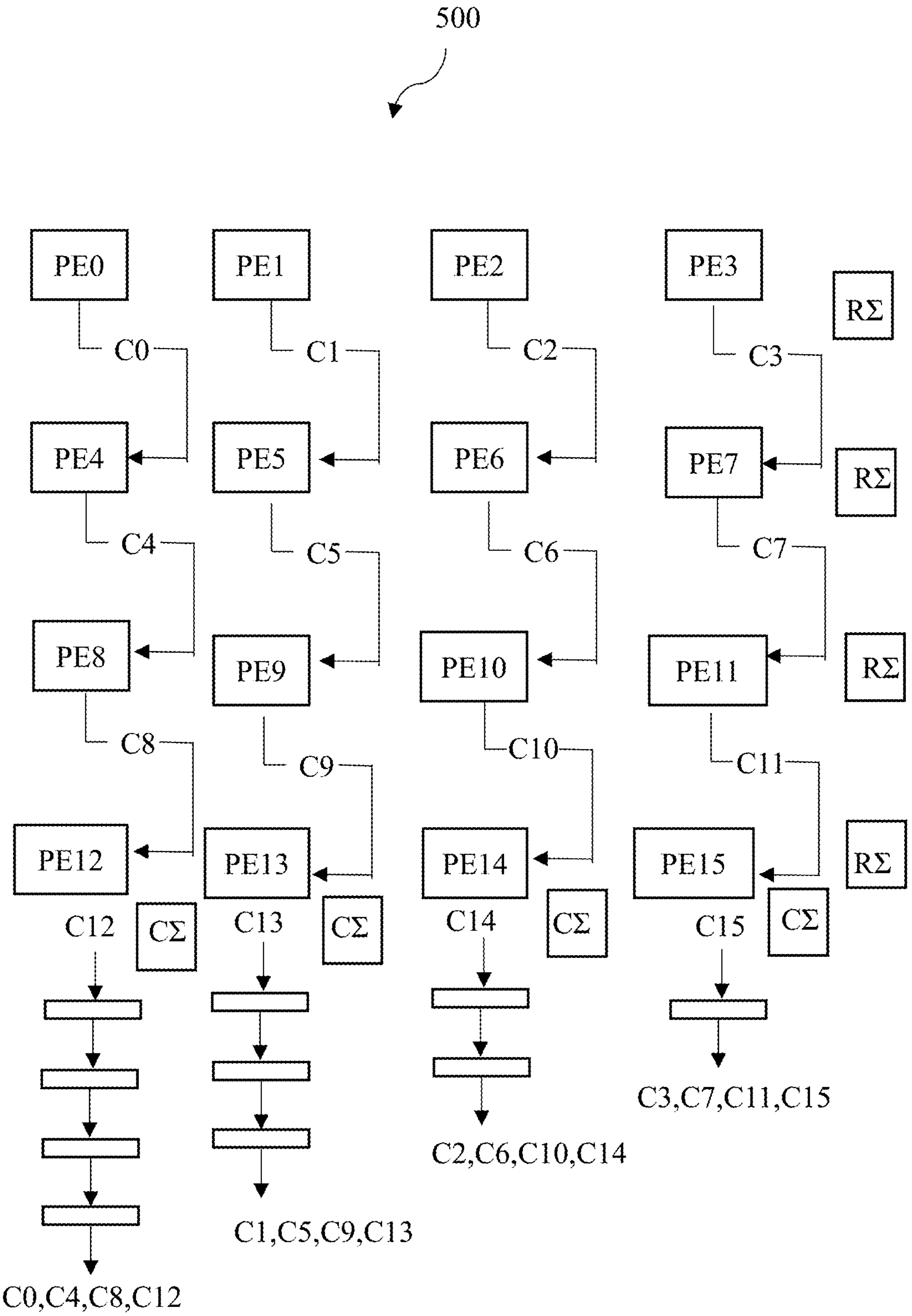
FIG. 5 is a block diagram illustrating an exemplary dataflow of the outputs streaming out of the systolic array of block matrix multipliers, in accordance with an embodiment of the present disclosure.

FIG. 5 illustrates an exemplary output data flow 500 of digit matrices out of the systolic array of PEs, in accordance with an embodiment of the present disclosure. To prevent congestion of wires and to output results in the correct cycle, the result of each PE is sent to the PE below to be forwarded, rather than being sent directly to the output. At every cycle, the systolic array outputs up to four sub-matrix multiplication results from the four bottom-most PEs. Concurrently, as the PE's are computing results, the sum of rows and columns of matrices A and B are calculated to be sent out to the combination unit 206.

Figure 6:
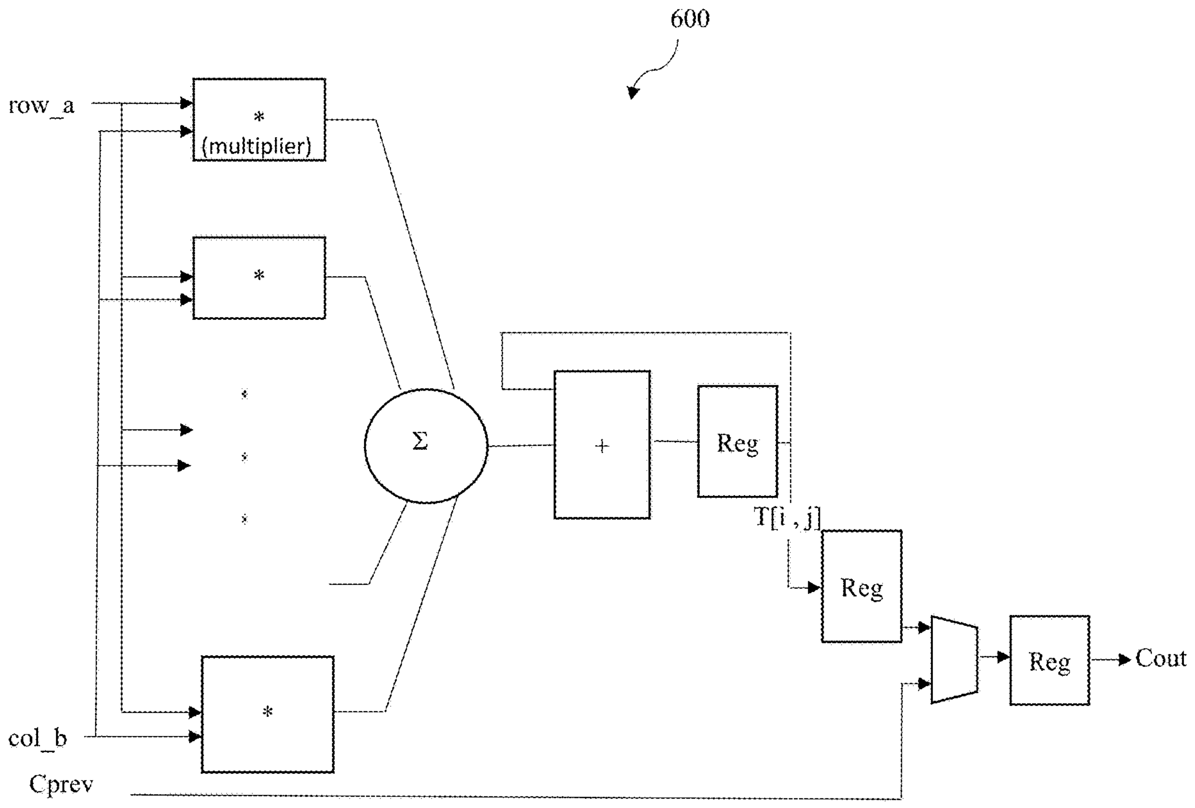
FIG. 6 is a block diagram illustrating an exemplary dot product unit (DPU), in accordance with an embodiment of the present disclosure.

FIG. 6 is a block diagram illustrating an exemplary dot product unit (DPU) 600, in accordance with an embodiment of the present disclosure.

Figure 7:
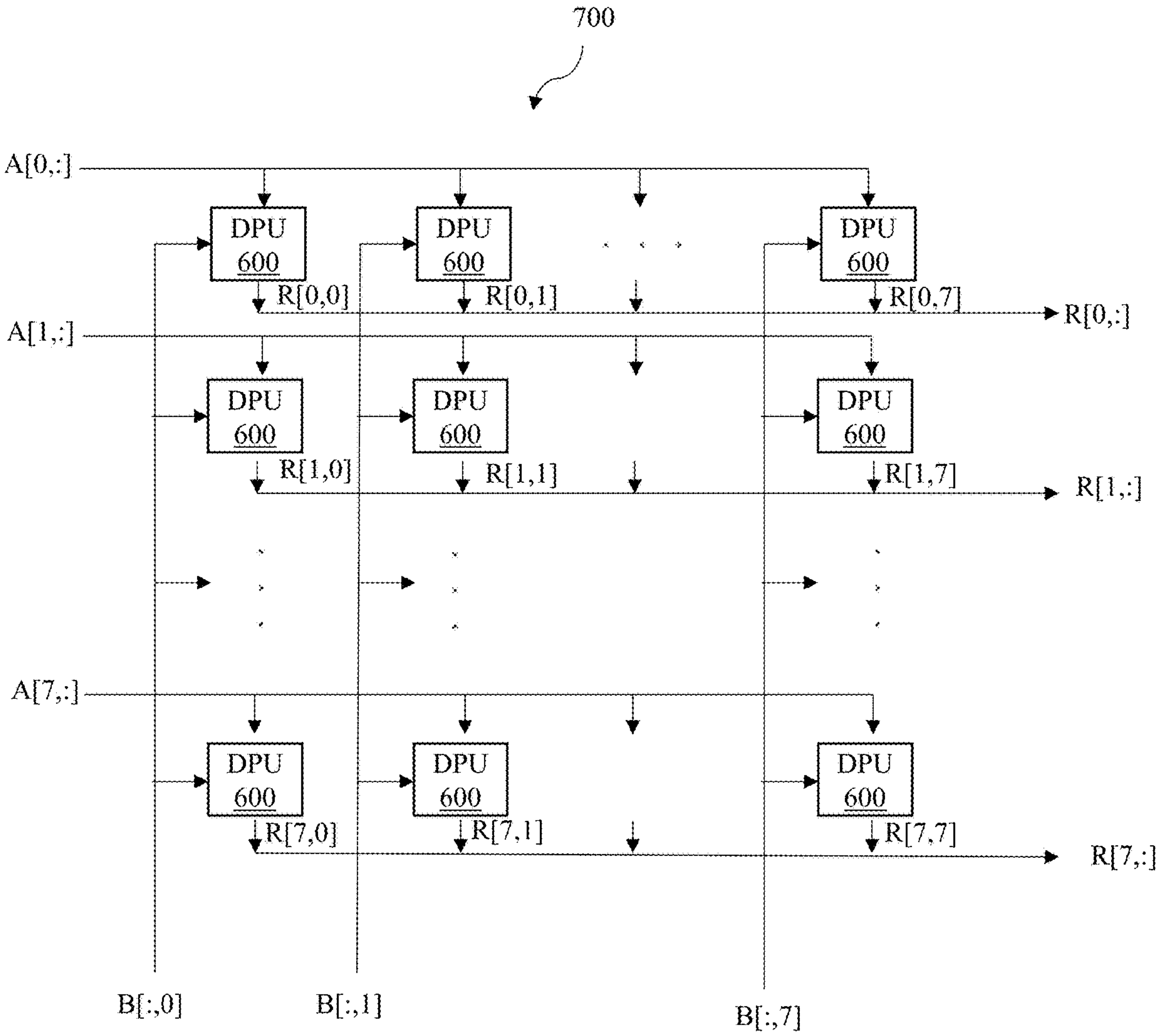
FIG. 7 is a block diagram illustrating an exemplary block matrix multiplier (PE), in accordance with an embodiment of the present disclosure.

FIG. 7 is a block diagram illustrating an exemplary block matrix multiplier (PE) 700, in accordance with an embodiment of the present disclosure. The block matrix multiplier 700 is an array of dot product units (DPU's) 600. Each of the dot product units (DPU's) 600 computes the dot product of a row of a block A with a column of a block B. In addition to several unsigned multipliers and an adder, each dot product unit (DPU) 600 includes a register. The register accumulates results of the dot product unit (DPU) 600 over time. For synchronisation of the results, the dot product unit (DPU) 600 includes an extra register and a mux to hold or forward the dot product unit (DPU) 600 outputs which come from the dot product units (DPU's) 600 in the block matrix multiplier (PE) 700 above it.

Figure 8:
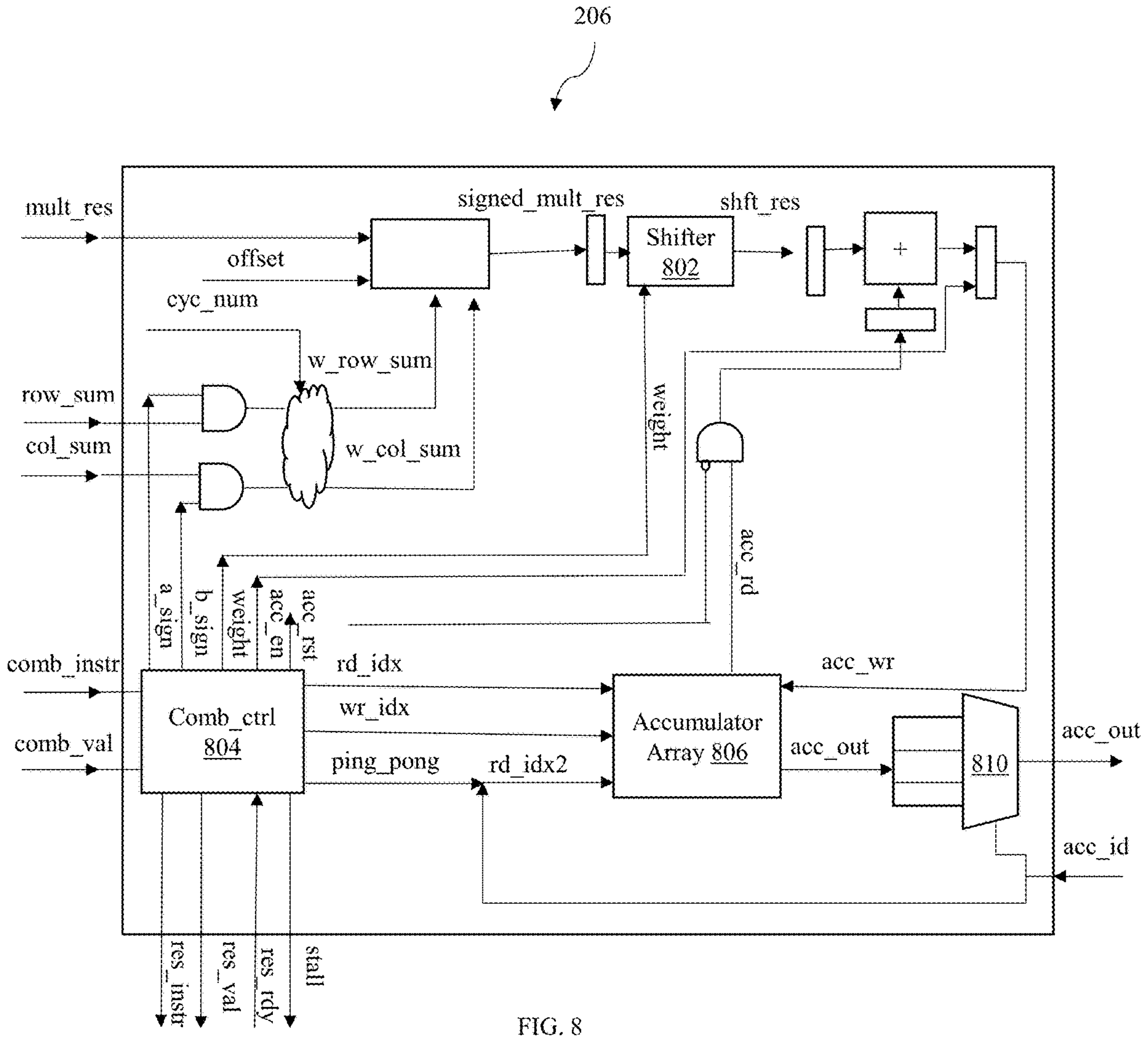
FIG. 8 is a block diagram illustrating an exemplary matrix combination unit, in accordance with an embodiment of the present disclosure.

FIG. 8 is a block diagram illustrating an exemplary matrix combination unit 206, in accordance with an embodiment of the present disclosure. Data has thus far been treated as unsigned. The signed product, as shown in equation (2), is the sum of an unsigned component, which is the result of the compute block, and an offset:

$$A[i,j]*B[i,j]=A'[i]*B'[j]-\alpha*\Sigma B[j]-\beta*\Sigma A[i]-\alpha*\beta \quad \text{equation (2).}$$

Here, the offset has three components: a weighted row sum of A[i], a weighted column sum of B[j], and a constant. In a combine stage 804 of the matrix combination unit 206, the offsets are subtracted from the unsigned component using the row sum of A[i] and column sum of B[j] which were both computed in the computation stage in parallel with the systolic array. Once the sign is adjusted for, the product is shifted using a shifter 802 to adjust weight due to multi-precision. Finally, the product is accumulated in an accumulator array 806. The accumulated results are read from the accumulator array 806 and sent to the output unit 208 via a multiplexer 810.

Figure 9A:
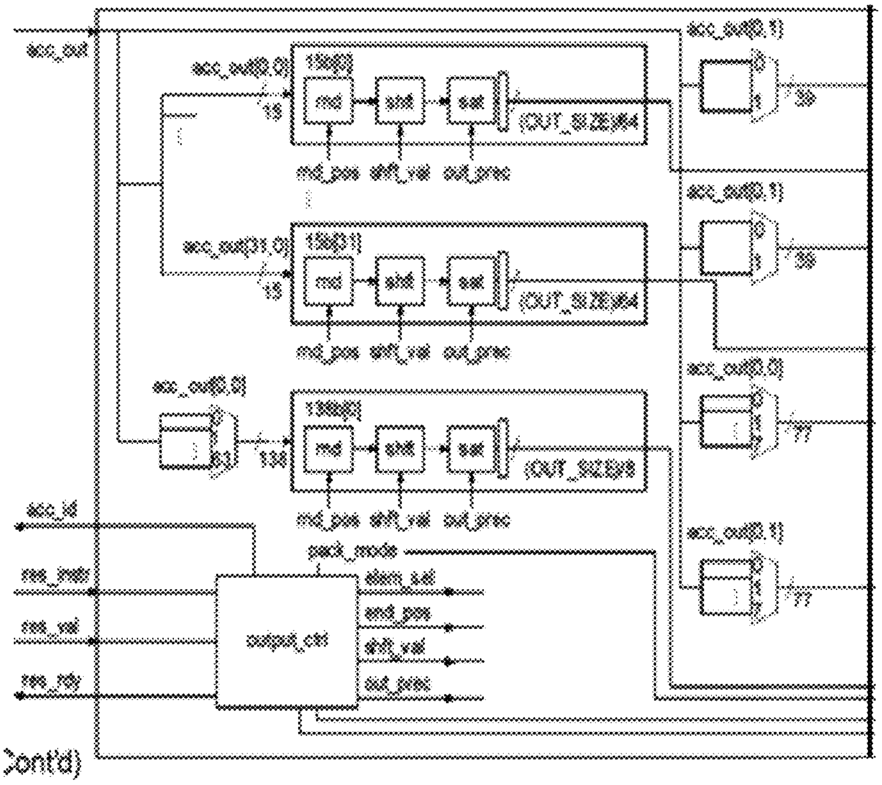
FIGS. 9A and 9B are a block diagram illustrating an exemplary output unit, in accordance with an embodiment of the present disclosure.
Figure 9B:
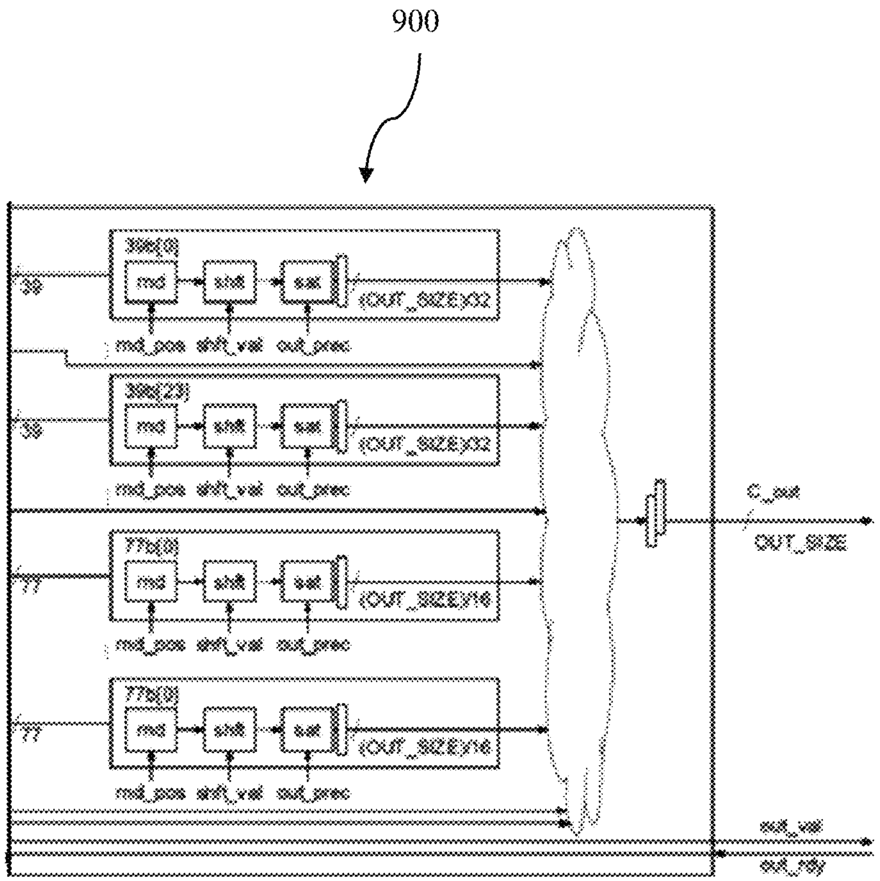

FIGS. 9A and 9B are a block diagram illustrating an exemplary output unit 900, in accordance with an embodiment of the present disclosure. A full-precision matrix multiply results is packed before outputting. The full precision matrix multiply results are rounded off, shifted, and saturated to a desired precision. The number of result elements at the output of the output unit 900 is small compared to number of total elements in A and B. The present design of the system 100 focuses more on outputting results over time instead of outputting the results all at once. Due to shifting, rounding, saturating and outputting results over time, less logic is used, due to which the design becomes more cost efficient. In an exemplary embodiment, the digit matrix multiplier unit 108 can compute a matrix multiplication of dimensions (32×1024)*(1024×32) and 64-bit precision and post-processing it by using just a single 138-bit wide shift, round, and saturate datapath over many cycles. This is done by outputting one element each for 1024 cycles. The digit matrix multiplier unit 108 can also efficiently compute smaller matrix multiplications. In an exemplary embodiment, a 32×32 matrix of 8-bit precision is multiplied with a 32×32 matrix of 2-bit precision and would output 64 elements per cycle for 16 cycles.

Figure 10A:
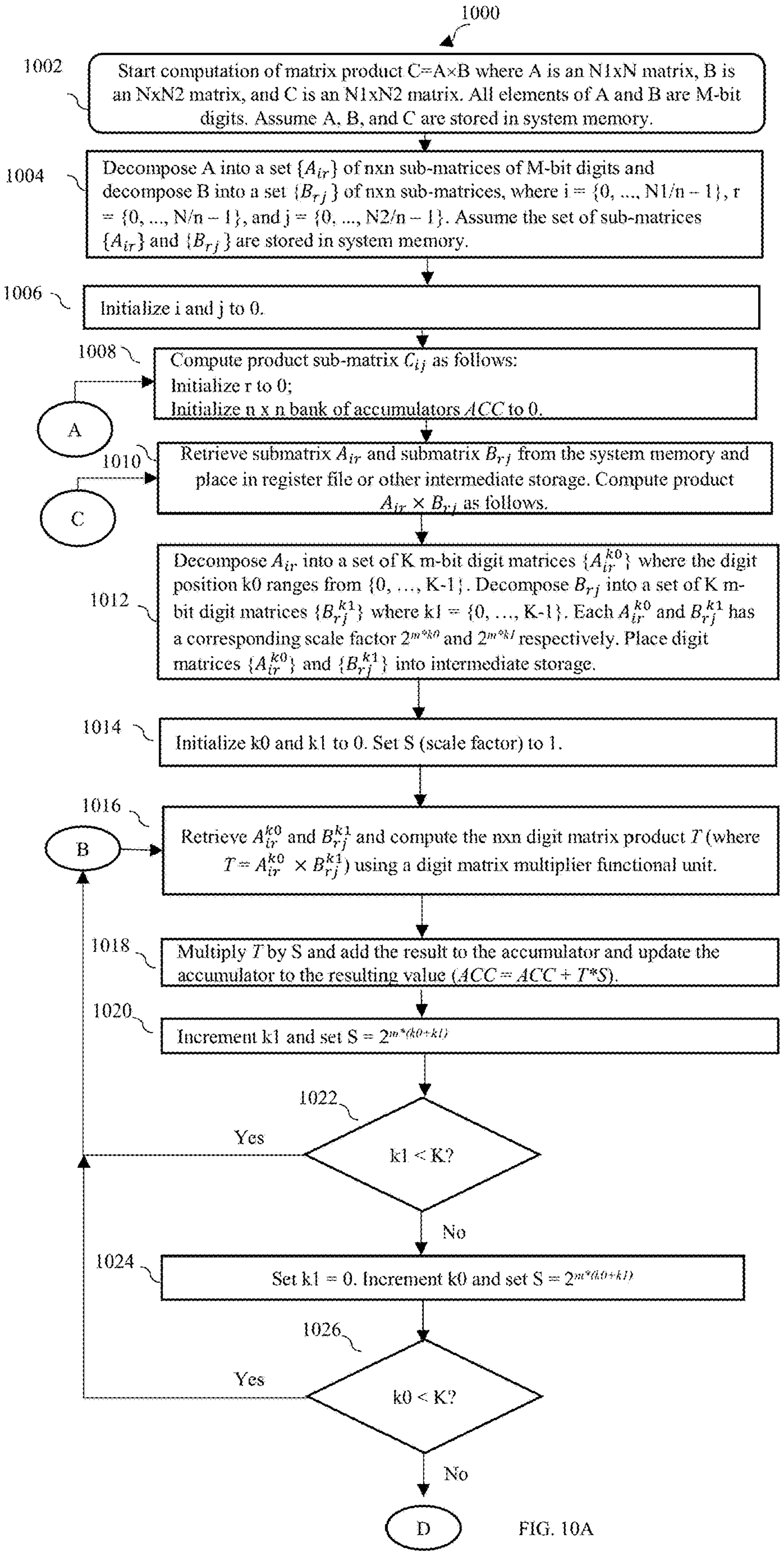
FIGS. 10A and 10B are a process flow diagram illustrating an exemplary method for implementing variable-precision matrix multiplications using a low-precision digit matrix multiplier, in accordance with an embodiment of the present disclosure.
Figure 10B:
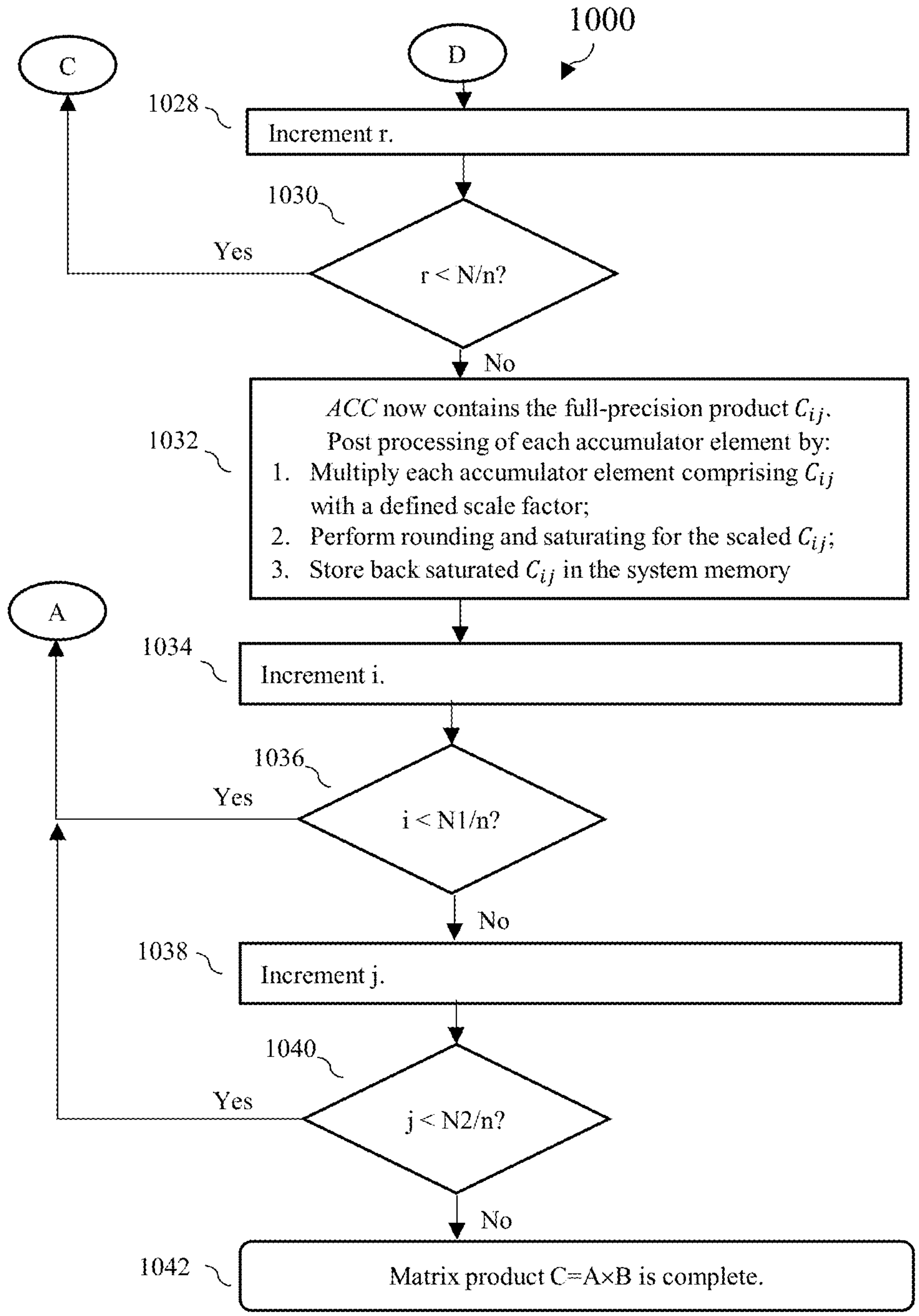

FIGS. 10A and 10B are a process flow diagram 1000 illustrating an exemplary method for implementing variable-precision matrix multiplications using a low-precision digit matrix multiplier, in accordance with an embodiment of the present disclosure. At step 1002, the method comprises computation of matrix product C=A*B where A is an N1×N matrix, B is an N×N2 matrix, and C is an N1×N2 matrix. All elements of A and B are M-bit digits. A, B, and C are stored in system memory 112. At step 1004, the method comprises decomposing a first matrix A into a set $\{A_{ir}\}$ of n×n sub-matrices of M-bit digits. The first matrix A is an N1×N matrix and is stored in a system memory 112. In this case:

$$i=\{0, \ldots, N1/n-1\} \text{ and } r=\{0, \ldots, N/n-1\} \quad \text{equation (3).}$$

The set $\{A_{ir}\}$ is stored in the system memory 112.

At step 1004, the method comprises decomposing a second matrix B into a set $\{B_{rj}\}$ of n×n sub-matrices of the M-bit digits. The second matrix B is an N×N2 matrix and is stored in the system memory 112. In this case:

$$r=\{0, \ldots, N/n-1\} \text{ and } j=\{0, \ldots, N2/n-1\} \quad \text{equation (4).}$$

The set $\{B_{rj}\}$ is stored in the system memory 112.

At step 1006, the method further comprises initializing i and j to 0.

At step 1008, the method comprises computing product sub-matrix $C_{ij}$. At step 1008 the method further comprises initializing r to 0 and initializing n×n bank of accumulators ACC to 0.

At step 1010 the method comprises retrieving the submatrix $A_{ir}$ and the submatrix $B_{rj}$ from the system memory 112 and placing in intermediate storage. Further, the method comprises computing of product $A_{ir}$×$B_{rj}$.

At step 1012, the method comprises decomposing the set $A_{ir}$ into a set of K m-bit digit matrices $$\{A_{ir}^{k0}\}.$$

The digit position k0 ranges from {0, . . . , K−1}. In this case, $$A_{ir}^{k0}$$

has a corresponding scale factor $2m^{m*k0}$. The digit matrix $$\{A_{ir}^{k0}\}$$

is placed in the intermediate storage. Similarly, the method further comprises decomposing the set $B_{rj}$ into a set of K m-bit digit matrices $$\{B_{rj}^{k1}\}.$$

In this case, the digit position k1={0, . . . , K−1}.

$$B_{rj}^{k1}$$

has corresponding scare factor $2^{m*1k}$. The digit matrix $$\{B_{rj}^{k1}\}$$

is placed in the intermediate storage.

At step 1014, the method comprises initializing k0 and k1 to 0 and scale factor S is set to 1. At step 1016, the method comprises retrieving $$A_{ir}^{k0} \text{ and } B_{rj}^{k1}$$

from the system memory 112. Further, the method comprises computing a third matrix T of n×n digit matrix by multiplying $$A_{ir}^{k0} \text{ and } B_{rj}^{k1}$$

using a digit matrix multiplier functional unit 108.

At step 1018, the method comprises multiplying the third matrix T by the scale factor S and adding respective product to the accumulator ACC. The accumulator ACC is updated with the resulting value:

$$ACC=ACC+T*S \quad \text{equation (5).}$$

At step 1020, the method comprises incrementing k1 and setting the scale factor S equal to $2^{m*(k0+k1)}$.

At step 1022, the method comprises determining whether k1<K.

If k1 is not less than K, then at step 1024, the method comprises setting k1 to 0, incrementing k0 and setting the scale factor S equal to $2^{m*(k0+k1)}$. If k1 is less than K, then the loop goes back to step 1016.

At step 1026, it is determined whether k0<K.

If k0 is not less than K, then at step 1028, the method comprises incrementing the value of r. If k0 is less than K, then the loop goes back to 1016.

At step 1030, it is determined whether r<N/n.

If r is not less than N/n, then at step 1032, the method comprises post-processing of each accumulator element by first multiplying each accumulator element comprising $C_{ij}$ with a defined scale factor, next performing rounding and saturating for the scaled $C_{ij}$ and lastly storing the saturated $C_{ij}$ in the system memory 112. If r is less than N/n, then the loop goes back to step 1010.

At step 1034, the method comprises incrementing i.

At step 1036, it is determined whether i<N1/n.

If i is not less than N1/n, then at step 1038 the method comprises incrementing j. If i is less than N1/n, then the loop goes back to step 1008.

At step 1040, it is determined whether j<N2/n.

If j is not less than N2/n, the at step 1042 the method comprises outputting a product matrix C=A*B. The product matrix C is an N1×N2 matrix. If j is less than N2/n, then the loop goes back to step 1008.

The method comprises repeating steps from 1008 to 1038 if i is less than N1/n and if j is less than N2/n.

The method further comprises repeating steps from 1010 to 1028, if r is less than N/n.

The method further comprises repeating steps from 1016 to 1020, if k1 is less than K.

The method further comprises repeating steps from 1016 to 1024, if k1 is less than K and if k0 is less than K.

Figure 11:
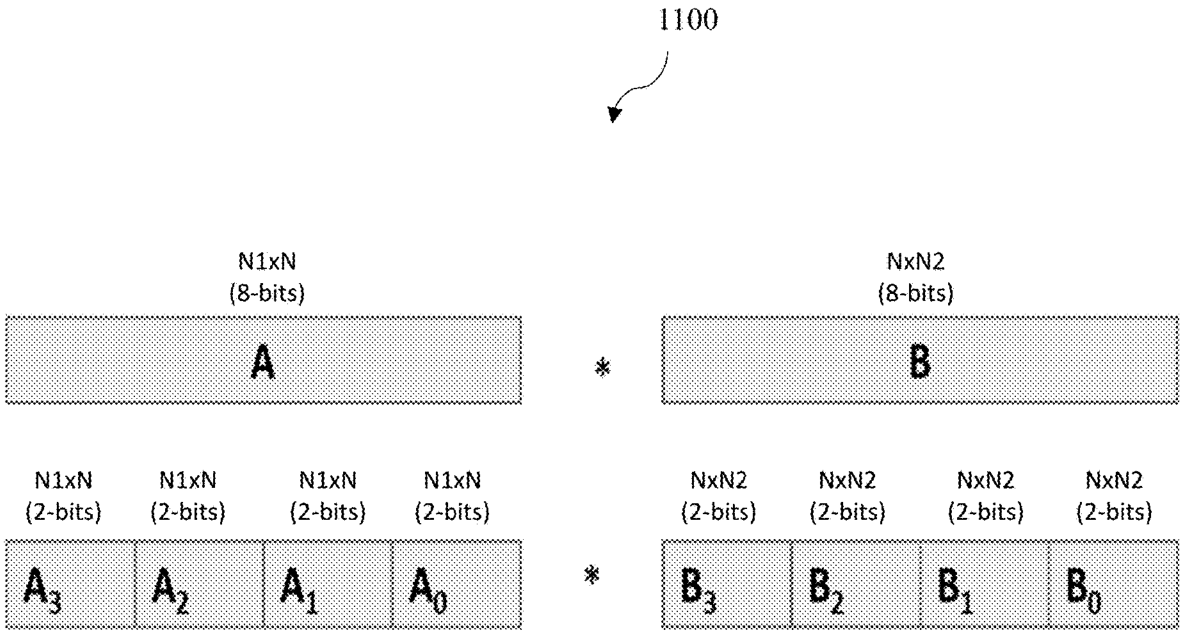
FIG. 11 is a block diagram illustrating the decomposing of matrices into digit matrices, in accordance with an embodiment of the present disclosure.

FIG. 11 is a diagram 1100 illustrating decomposition of submatrices into digit matrices, in accordance with an embodiment of the present disclosure. A matrix can be represented as a sequence of digit matrices (similar to an integer being represented as a sequence of digits). Matrix multiplication can be performed in terms of digit matrix multiplications. The number of digit matrices that decomposition produces depends on the original matrix's precision and the supported digit size. This allows for using a fixed digit matrix multiplier to implement multi-precision matrix multiplication.

In one exemplary embodiment, a method for implementing variable-precision matrix multiplications using a low precision digit matrix multiplier is explained below. Consider there are two matrices A and B stored in the system memory 112. A is a 12×12 matrix of 8-bit digits. B is a 12×12 matrix of 8-bit digits. Each matrix has 122 elements, where each element is stored as an 8-bit number. A 4×4 digit matrix of 2-bit digits is used. A and B are each decomposed into 4×4 matrices of 2-bit digits.

The first step of multiplication of matrices A and B includes decomposing of A into submatrices, as shown below:

$$A=[A_{00}A_{01}A_{02}A_{10}A_{11}A_{12}A_{20}A_{21}A_{22}] \text{equation (6)}$$

Each submatrix $A_{ij}$ is a 4×4 matrix. For example, $A_{00}$ is a 4×4 matrix of 16 scalar elements as shown below:

$$A_{00}=[a_{00}a_{01}a_{02}a_{03}a_{10}a_{11}a_{12}a_{13}\ a_{20}a_{21}a_{22}a_{23}a_{30}a_{31}a_{32}a_{33}] \quad \text{equation (7)}$$

Elements of a submatrix are full-precision (same precision as A's elements).

At step II, B is decomposed, where the matrix B can be similarly decomposed into 4×4 block submatrices as shown below:

$$B_{00}=[B_{00}B_{01}B_{02}B_{10}B_{11}B_{12}B_{20}B_{21}B_{22}] \quad \text{equation (8)}$$

Each of the 9 submatrices is further decomposed into four 4×4 digit matrices of 2-bit digits as shown below:

$$B_{00}=2^6\times B_{00}^3+2^4\times B_{00}^2+2^2\times B_{00}^1+2^0\times B_{00}^0 \quad \text{equation (9)}$$

The same process is done for A.

At step III, the product C of A and B is decomposed. The 12×12 matrix product C=A×B is implemented with 4×4 sub-matrices as shown below:

$$[[C_{00}C_{01}C_{02}],[C_{10}C_{11}C_{12}],[C_{20}C_{21}C_{22}]]=[[A_{00}A_{01}A_{02}],[A_{10}A_{11}A_{12}],[A_{20}A_{21}A_{22}]]\times[B_{00}B_{01}B_{02}],[B_{10}B_{11}B_{12}],[B_{20}B_{21}B_{22}] \quad \text{equation (10)}$$

Each output submatrix is calculated by multiplying 3 submatrices and adding the results together. For example, $C_{00}$ can be calculated as shown below:

$$C_{00}=A_{00}\times B_{00}+A_{01}\times B_{10}+A_{02}\times B_{20} \quad \text{equation (11)}$$

Therefore, the matrix product A×B can be decomposed into 27 submatrix multiply and add operations. For each one of these 27 operations, the processor fetches a submatrix $A_{ir}$ and a sub-matrix $B_{rj}$ and decomposes each into their constituent digit matrices such as 4 digit matrices for $A_{ir}$ and 4 digit matrices for $B_{rj}$ and implements 16 digit matrix multiply, scale and add operations. There are a total of 27×16=432 digit matrix multiply scale and add operations to implement A×B.

At step IV, which is a single digit matrix multiply needed in step III, the product $A_{00}\times B_{00}$ is multiplied in the following manner:

At the first sub-step of step IV, a processor fetches $A_{00}$ and $B_{00}$ from system memory 112. At this point, $A_{00}$ and $B_{00}$ are 4×4 matrices of 8-bit elements.

At the second sub-step of step IV, the processor decomposes $A_{00}$ into four 4×4 digit matrices of 2-bit elements:

$$(A_{00}^0, A_{00}^1, A_{00}^2 \text{ and } A_{00}^3) \quad \text{equation (12)}$$

At the third sub-step of step IV, the processor similarly decomposes $B_{00}$ into four 4×4 digit matrices of 2-bit elements:

$$(B_{00}^0, B_{00}^1, B_{00}^2 \text{ and } B_{00}^3) \quad \text{equation (13)}$$

At the fourth sub-step of step IV, the processor multiplies $$A_{00}^0 \text{ and } B_{00}^0$$

and stores the resulting 4×4 matrix into a bank of 4×4 accumulators. Each element of the accumulator is wide enough to store the result of the largest matrix multiply supported by the system 100. While the result of $$A_{00}^0 \times B_{00}^0$$

would only need 6-bits to store each element, each element of the accumulator bank could be much wider such as 100 bits or more.

At the fifth sub-step of step IV, the processor multiplies $$A_{00}^0 \text{ and } B_{00}^1.$$

The processor multiplies the result by the scale of $$B_{00}^1,$$

which is $2^2$ and adds the result to the accumulator. Therefore, the accumulator contains the result of $$acc = A_{00}^0 \times B_{00}^0 + 2^2 \times A_{00}^0 \times B_{00}^1 \quad \text{equation (14)}$$

At the sixth sub-step of step IV, the processor multiplies $$A_{00}^0 \text{ and } B_{00}^2,$$

applies a scale factor of $2^4$ and adds the result to the accumulator. The accumulator thus contains the result of $$acc = A_{00}^0 \times B_{00}^0 + 2^2 \times A_{00}^0 \times B_{00}^1 + 2^4 \times A_{00}^0 \times B_{00}^2 \quad \text{equation (15)}$$

The seventh sub-step of step IV includes adding $$(A_{00}^0 \times B_{00}^3) \times 2^6.$$

The resulting accumulator state is as shown below:

$$acc = A_{00}^0 \times B_{00}^0 + 2^2 \times A_{00}^0 \times B_{00}^1 + 2^4 \times A_{00}^0 \times B_{00}^2 + 2^6 \times A_{00}^0 \times B_{00}^3 \quad \text{equation (16)}$$

At the eighth sub-step of step IV, the process is continued similarly for each combination $$A_0^i \text{ and } B_0^j: \quad \text{equation (17)}$$

$$acc = acc + 2^2 \times A_{00}^1 \times B_{00}^0$$
$$acc = acc + 2^4 \times A_{00}^1 \times B_{00}^1$$
$$acc = acc + 2^6 \times A_{00}^1 \times B_{00}^2$$
$$acc = acc + 2^8 \times A_{00}^1 \times B_{00}^3$$

Then:

$$acc = acc + 2^4 \times A_{00}^2 \times B_{00}^0 \quad \text{equation (18)}$$
$$acc = acc + 2^6 \times A_{00}^2 \times B_{00}^1$$
$$acc = acc + 2^8 \times A_{00}^2 \times B_{00}^2$$
$$acc = acc + 2^{10} \times A_{00}^2 \times B_{00}^3$$

Finally:

$$acc = acc + 2^6 \times A_{00}^3 \times B_{00}^0 \quad \text{equation (19)}$$
$$acc = acc + 2^8 \times A_{00}^3 \times B_{00}^1$$
$$acc = acc + 2^{10} \times A_{00}^3 \times B_{00}^2$$
$$acc = acc + 2^{12} \times A_{00}^3 \times B_{00}^3$$

Once all digit matrices for $A_{00}$ and $B_{00}$ have been multiplied, scaled and added to the accumulator, the accumulator contains the results for $A_{00} \times B_{00}$.

At step V, the product $A_{01} \times B_{10}$ is calculated. Once step IV is completed, the processor fetches $A_{01}$ and $B_{10}$ and repeats the second sub-step of step IV through the eighth sub-step of step IV on these submatrices. Each digit matrix product is scaled appropriately and added to the accumulator. At the end of step V, the accumulator contains:

$$A_{00} \times B_{00} + A_{01} \times B_{10} \quad \text{equation (20)}$$

At step VI, product of $A_{02} \times B_{20}$ is decomposed. Step VI is identical to step V. At the end of step VI, the accumulator contains:

$$C_{00} = A_{00} \times B_{00} + A_{01} \times B_{10} + A_{02} \times B_{20} \quad \text{equation (21)}$$

Note that this is the same as equation (11).

At this point, 48 digit matrix multiply results have been added to the accumulator after appropriate scaling.

Step VII includes post-processing of the accumulator results. Once $C_{00}$ has been calculated, the accumulator's results must be scaled, rounded and saturated to the desired output bit width, and the results must be committed back to system memory 112. The results stored in each element of the accumulator for this example occupy 20 bits such as 12 additions of 8 bit×8 bit multiplies requires 20 bits. The physical accumulator element may be much larger than 20-bits to accommodate the product of large matrices. For example, an 8-bit output precision is desired. Furthermore, consider a user specifies a scale factor of 1/1024. The data post processing subsystem would shift the data right by 10 bits (equivalent to multiplying each accumulator element by 1/1024) and range limit the result to 8 bits by rounding and saturating. The resulting 4×4 matrix of 8-bit elements is stored back into the system memory 112 to complete the process for $C_{00}$.

Step VIII includes calculation for $C_{01}$ through $C_{22}$. The process for calculating $C_{01}$ through $C_{22}$ is identical to the process described above for $C_{00}$ in step VII. Overall, 48×9=432 digit matrix multiply operations are needed to calculate C.

In an additional embodiment, the present disclosure is applicable to both signed and unsigned arithmetic operations and multi-precision arithmetic operations.

Generally, in fixed point arithmetic, the number of bits needed to maintain full precision increases with each operation. When adding two fixed point numbers, the number of bits increases by 1. When multiplying two numbers, the number of bits doubles, since multiplication is essentially the same as adding a number to itself many times. When adding n numbers, the bit growth is $\log_2 n$. An unsigned n-bit number can hold values from 0 to $2^n-1$. A signed n-bit number in 2's complement representation can hold values from $-2^{n-1}$ to $2^{n-1}-1$. One way to go from a signed number to an unsigned number is to add the offset $2^{n-1}$ so that it now has the range 0 to $2^n-1$.

An embodiment of the present disclosure allows multiplication of two signed matrices using an unsigned matrix multiplier. This can be achieved by adding a fixed offset to all the numbers. Let A (with dimensions k1×k2) and B (with dimensions k2×k3) be two signed matrices and A' (k1×k2) and B' (k2×k3) be the unsigned equivalent of A and B respectively.

If α and β are scalars representing the offset and 1 represents a matrix of ones (same dimensions as A and B, respectively; not the same as identity matrix I), the equation (22) below shows how the signed matrix multiplication would be calculated using the unsigned matrix multiplication result. The equation (22) below depicts signed matrix multiplication in terms of unsigned product:

$$A'*B'=(A+\alpha 1)(B+\beta 1)$$

$$A'*B'=A*B+A*(\beta 1)+(\alpha 1)*B+(\alpha 1)*(\beta 1)$$

$$A*B=A'*B'-A*(\beta 1)-(\alpha 1)*B-(\alpha 1)*\beta(1) \quad \text{Equation (22)}$$

In an alternate embodiment, two middle entries may be used to compute the product as below:

$$A*(\beta 1) = \beta * \sum_{i=0}^{k1} A[i] \quad \text{equation (23)}$$

$$(\alpha 1)*B = \alpha * \sum_{j=0}^{k3} B[j]$$

Equation (23) depicts weighted row sum of A and weighted column sum of B. Essentially, the first term is a scaled version of a row sum of A and the second term is a scaled version of a column sum of B. Rather than compute the matrix multiplication with a matrix of ones, the present system 100 uses the row sum and column sum to simplify this calculation, as done in the present disclosure design.

This decomposition of a signed matrix multiplication into an unsigned multiplication and offset will be used in this design so that the matrix multiplier can compute an unsigned or signed matrix multiplication without requiring a separate signed and unsigned multiplier.

In case of multi-precision arithmetic, an embodiment of the present disclosure allows the system 100 to break the data into digits of fixed precision to use a small fixed-precision multiplier to multiply larger data. Suppose a and b are each 8-bit data and the multiplier takes data of 2-bit precision. a and b are each decomposed into 2-bit digits, so there are 4 digits of a and 4 digits of b. Each 2-bit digit of a needs to be multiplied with each 2-bit digit of b and shifted, depending on the bit position of that digit. The final product would be computed as shown below:

$$\begin{aligned} a*b = {} & a3*b3*2^{12} + a3*b2*2^{10} + a3*b1*2^{8} + a3*b0*2^{6} + \\ & a2*b3*2^{10} + a2*b2*2^{8} + a2*b1*2^{6} + a2*b0*2^{4} + \\ & a1*b3*2^{8} + a1*b2*2^{6} + a1*b1*2^{4} + a1*b0*2^{2} + \\ & a0*b3*2^{6} + a0*b2*2^{4} + a0*b1*2^{2} + a0*b0*2^{0} \end{aligned} \quad \text{equation (24)}$$

This same approach can be applied to matrix multiplication. Matrices would be broken up into digit matrices as shown in FIG. 11. This allows us to use a fixed digit matrix multiply to implement multi-precision matrix multiply. Equation (25) below shows how this would be calculated:

$$\begin{aligned} A*B = {} & A3*B3*2^{12} + A3*B2*2^{10} + A3*B1*2^{8} + A3*B0*2^{6} + \\ & A2*B3*2^{10} + A2*B2*2^{8} + A2*B1*2^{6} + A2*B0*2^{4} + \\ & A1*B3*2^{8} + A1*B2*2^{6} + A1*B1*2^{4} + A1*B0*2^{2} + \\ & A0*B3*2^{6} + A0*B2*2^{4} + A0*B1*2^{2} + A0*B0*2^{0} \end{aligned} \quad \text{equation (25)}$$

This is significant because the multipliers in the present design are of fixed precision but can be used for multi-precision computations. A multiplier would compute each sub-product, such as A3*B3, and a shifter would adjust the weight, in this case shifting A3*B3 left by 12. This ability to process different sized data using a fixed size block is what makes it multi-precision.

Various embodiments of the present disclosure relate to a system using a low-precision digit matrix multiplier for operations. The operations include any multiples of the digit size. The present system handles range of precisions, such as 2-bit, 4-bit, 6-bit, 12-bit, 64-bit. In contrast to existing designs, the present systems' design supports dynamic selection of precisions, making it easy to select a different precision for each individual operation and hence maximizing power efficiency. The number of multiply operations and cycles required for multiplying two 6-bit precision matrices in this design is little over half that is required using 8-bit precision. Therefore, the present system is useful to be able to dynamically select precision and thus improves power consumption and latency.

Furthermore, the purpose of the present disclosure design is to have the ability to multiply two matrices of variable dimensions and precisions using a fixed sized matrix multiplier. The system 100 breaks up the two matrices into matrices of a fixed precision and dimension, feeding those new matrices to the matrix multiplier over time. The product of each is computed in a systolic array of block matrix multipliers, accumulated in a set of accumulators, and sent back to the register file 106. Over time, the result of the entire matrix multiply of the original matrices is computed.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A system for implementing variable-precision matrix operations that uses an array of low-precision (1, 2, and 4 bits) unsigned integer dot product units and an array of higher-precision accumulators to calculate a matrix product of higher-precision integer elements, the system comprising:

one or more hardware processors;

a computer readable medium coupled to the one or more hardware processors, wherein the computer readable medium comprises a set of program instructions in a form of a plurality of subsystems, configured to be executed by the one or more hardware processors, wherein the plurality of subsystems comprises:

a load store unit configured to load and store data between a register file and a system memory, the system memory being one of: external and on-chip;

the register file configured to provide the data in natural order to a permute unit, wherein the matrices are stored in a natural order with each element in a row stored contiguously;

the permute unit comprising circuitry configured to deinterleave the data, wherein the deinterleaving comprises converting a matrix of multi-digit elements into multiple matrices with single-digit elements of same weight stored contiguously, and converting the data into fixed dimension and fixed precision sub-matrices, wherein the deinterleaved data is stored back into the register file; and a Digit Matrix Multiplier Unit configured to receive digit matrices in deinterleaved form from the register file, wherein the Digit Matrix Multiplier Unit comprises a plurality of subsystems to perform the following operations:

an input unit comprising one or more buffers and circuitry configured to decode instructions and generate control signals, wherein concurrently, the digit matrices are buffered, and a portion of the digit matrices are transmitted to a compute unit to be multiplied;

the compute unit comprising a systolic array of processing elements, each processing element comprising an array of dot product units, wherein each dot product unit configured to compute a product of two digit matrices and to transmit the product to a matrix combination unit to be accumulated wherein each dot product unit computes a dot-product of one row and one column of the digit matrix;

the matrix combination unit comprising an accumulator array and a shifter, configured to accumulate results of current digit matrix multiplications with results of previous multiplications and apply scale factors to account for multi-precision computations, and apply offsets to account unsigned product to signed product conversion, wherein the accumulation results are stored locally inside the matrix combination unit and transmits a portion of the results to an output unit; and the output unit comprising circuitry configured to convert full-precision elements of the matrix product to a reduced precision by rounding off the full precision matrix multiply results, shifting the rounded results, and saturating the shifted results to a desired precision.

2. The system of claim 1, wherein the Digit Matrix Multiplier Unit uses unsigned digit matrix multiplication to calculate a product of two signed matrices and adjusts for sign correction using a sum of all elements within each row of one matrix and a sum of all elements within each column of the other matrix, wherein the row sums and column sums are calculated using dedicated hardware blocks.

3. A computer-implemented method for implementing variable-precision matrix operations using a low-precision (1-, 2-, and 4-bit) digit matrix multiplication, the method comprising:

(a) decomposing by a permute unit, a first matrix A into a set $\{A_{ir}\}$ of n×n sub-matrices of M-bit elements, wherein the first matrix A is an N1×N matrix, and wherein i={0, . . . , N1/n−1} and r={0, . . . , N/n−1};

(b) decomposing by the permute unit, a second matrix B into a set $\{B_{rj}\}$ of n×n sub-matrices of M-bit elements, wherein the second matrix B is an N×N2 matrix, and wherein r={0, . . . , N/n−1} and j={0, . . . , N2/n−1};

(c) initializing i and j to 0;

(d) computing product sub-matrix $C_{ij}$, wherein the computation comprises:

(d1) initializing r to 0 and initializing, by a matrix combination unit, n×n bank of accumulators ACC to 0;

(d2) retrieving, by a load-store unit, the submatrix, $A_{ir}$ and the submatrix $B_{rj}$ from one of a subset comprising on-chip and off-chip shared memory, and then placing the submatrix into an intermediate storage location; and (d3) computing product $A_{ir}\times B_{rj}$, wherein the computing comprises:

(d3i) decomposing, by the permute unit, $A_{ir}$ into a set of K m-bit digit matrices $$\{A_{ir}^{k0}\},$$

wherein K=M/m and digit position k0 ranges from {0, . . . , K−1}, and wherein $$A_{ir}^{k0}$$

has a corresponding scale factor $2^{m*k0}$, and wherein the digit matrix $$\{A_{ir}^{k0}\}$$

is placed in the intermediate storage location;

(d3ii) decomposing, by the permute unit, $B_{rj}$ into a set of K m-bit digit matrices $$\{B_{rj}^{k1}\},$$

wherein K=M/m and digit position k1={0, . . . , K−1}, and wherein $$B_{rj}^{k1}$$

has the corresponding scale factor $2^{m*k1}$, and wherein the digit matrix $$\{B_{rj}^{k1}\}$$

is placed in the intermediate storage location;

(d3iii) initializing k0 and k1 to 0 and setting a scale factor S to 1;

(d3iv) retrieving $$A_{ir}^{k0} \text{ and } B_{rj}^{k1}$$

from the intermediate storage location;

(d3v) computing, by a compute unit comprising a systolic array of processing elements, a third n×n matrix T by multiplying $$A_{ir}^{k0} \text{ and } B_{rj}^{k1}$$

using digit matrix multiplication;

(d3vi) multiplying, by a digit matrix multiplier functional unit, the third matrix T by the scale factor S and adding a respective product to the accumulator (ACC), wherein the accumulator is updated for resulting value ACC'=ACC+T*S;

(d3vii) incrementing, by the digit matrix multiplier functional unit, k1 and setting the scale factor S equal to $2^{m*(k0+k1)}$ and going back to step d3iv provided that k1 is less than K otherwise going to step d3viii;

(d3viii) setting, by the digit matrix multiplier functional unit, k1 to 0, incrementing k0 and setting the scale factor S equal to $2^{m*(k0+k1)}$ and going back to step d3iv provided that k0 is less than K otherwise going to step d3ix;

(d3ix) incrementing, by the digit matrix multiplier functional unit, the value of r and going back to step d2 provided that r is less than N/n otherwise going to step e;

(e) post processing, by an output unit, each accumulator element by:

applying a defined scale factor to each accumulator element comprising $C_{ij}$;

performing rounding and saturating of a scaled element of $C_{ij}$; and storing the resulting scaled element in either the on-chip or off-chip shared memory;

(f) incrementing j and going back to step d provided that j is less than N2/n, otherwise going to step g; and (g) setting j to 0, incrementing i, and going back to step d provided that i is less than N1/n.

4. The computer-implemented method of claim 3, wherein matrix A and matrix B are broken into rectangular sub-matrices of dimensions n1×n2 and n2×n3 respectively.

5. The computer-implemented method of claim 3, wherein matrix A and matrix B have different element sizes M1 and M2 respectively.

6. The computer-implemented method of claim 3, wherein the order of loops in step d3 (incrementing k0 and k1) is changed when computing the product of $$A_{ir}^{k0}$$

and $$B_{rj}^{k1}.$$

7. The computer-implemented method of claim 3, wherein the order of the loop in step d (incrementing r) is changed when computing the product $C_{ij}$.

8. The computer-implemented method of claim 3, wherein the order of loops (incrementing i and j) is changed when computing the product of $A_{ir}$ and $B_{rj}$.

* * * * *